J. J. SEAMAN.
APPARATUS FOR INJECTING LIQUIDS INTO PNEUMATIC TIRES.
APPLICATION FILED NOV. 1, 1912.

1,115,589.

Patented Nov. 3, 1914.

Witnesses

Jacob J. Seaman
Inventor,
by C. A. Snow & Co.
Attorneys.

UNITED STATES PATENT OFFICE.

JACOB J. SEAMAN, OF WINFIELD, KANSAS.

APPARATUS FOR INJECTING LIQUIDS INTO PNEUMATIC TIRES.

1,115,589.    Specification of Letters Patent.    Patented Nov. 3, 1914.

Application filed November 1, 1912. Serial No. 729,120.

*To all whom it may concern:*

Be it known that I, JACOB J. SEAMAN, a citizen of the United States, residing at Winfield, in the county of Cowley and State of Kansas, have invented a new and useful Apparatus for Injecting Liquids into Pneumatic Tires, of which the following is a specification.

The present invention relates to improvements in apparatus for injecting liquids into pneumatic tires, the primary object of the invention being the provision of an apparatus of this character to be disposed between an air supplying source or pump and a pneumatic tire, whereby a semi-liquid for filling the leaking fissures of the tire may be properly supplied within the tube of the tire, there being an air chamber interposed between the liquid holding chamber and the pump or air source so that the air pressure will be supplied steadily and without interruption, the connection between the two being such that the semi-liquid can not enter the air chamber.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
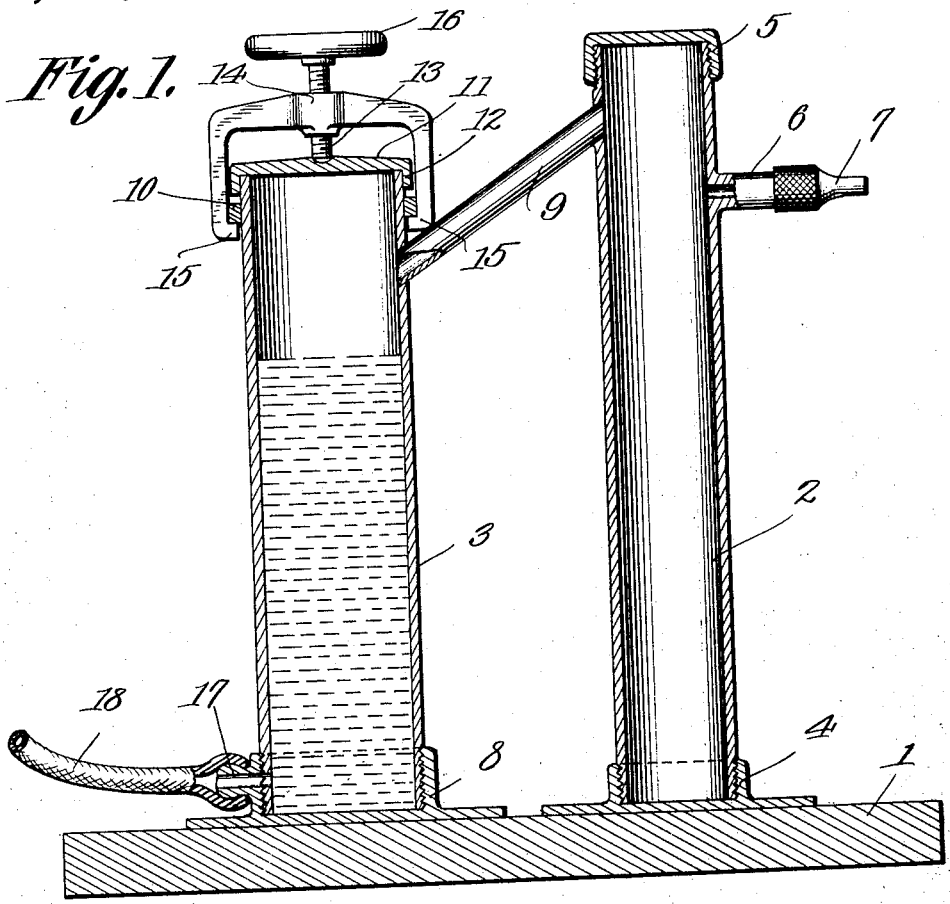
Figure 2:
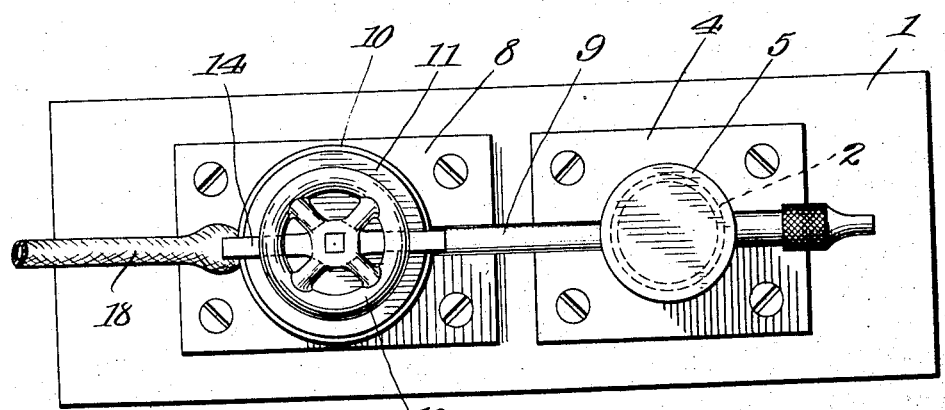

In the drawings—Figure 1 is a vertical central sectional view through the two chambers of the apparatus. Fig. 2 is a top plan view of the complete apparatus.

Referring to the drawings, the numeral 1 designates the base upon which is carried the vertical and cylindrical air chamber or column 2 and the liquid containing reservoir or column 3.

The column or air chamber 2 is mounted in a disk 4 secured to the base 1 and is sealed by a cap 5, a nipple 6 being provided and having attached thereto a conduit 7 which is led from a pump or other air supplying medium.

The liquid containing vertical and cylindrical column or reservoir 3 is mounted in a cap or disk 8 secured upon the base 1 and parallel with the chamber 2. Leading inclinedly downward from the upper end of the air chamber or column 2 into the upper end of the reservoir 3 is the air conducting tube or pipe 9, the same being so disposed that the liquid in the chamber 3 cannot possibly flow into the air chamber 2. The chamber 3 is adapted to be filled through its upper end, to a point below the inlet end of the pipe 9, with a semi-liquid which will harden when exposed to the atmosphere, but which under normal conditions within an inflated tire will remain in a semi-liquid state. The present apparatus is designed to inject such semi-liquid through the valve stem of the tire into the inner tube thereof. In order to provide a removable cover which is air tight and will prevent any leakage at the upper open end of the chamber or reservoir 3, an annular ring 10 is carried near the upper end of the reservoir or chamber 3, while fitting upon the upper end is a cap 11 having the annular flange or rim 12, as clearly shown in Fig. 1.

In order to provide a means for clamping the cover tightly in place upon the upper end of the reservoir or chamber 3, a screw 13 is carried by the frame 14, and opposes the cover 11 concentrically thereof, while disposed to engage the annular rim 10 at diametrically opposite points are the hooked terminals 15 of the frame. It will thus be seen that when the hand wheel 16 is rotated to cause the screw to engage the cover 11, that the yoke will be forced against the annular rim while the cover will be held tightly upon the upper open end of the column or chamber 3.

In order that the compound or semi-liquid contained in the chamber 3 may be supplied to the tire (not shown), an outlet nipple 17 is provided in the lower end of the chamber 3 and has led thereaway from the tube 18.

From the foregoing description, taken in connection with the drawings it is evident that with an injector constructed according to the present invention and interposed between an air supply pipe from a pump or other source and a tube leading to the valve nipple of a pneumatic tire, will permit of the steady introduction or injection of the anti-leak compound contained in the reservoir or column 3 and such anti-leak compound will not enter the air chamber 2 and thus gum the connections as is the case when air is pumped directly from the pump into the upper end of the chamber 3. By interposing a chamber, such as 2, between the air supply pipe 7 and the conducting pipe 9, a steady flow of air is supplied to the upper end of the chamber or column 3 so that the liquid contained therein will be forced through the port 17 and the tube 18 in a steady flow and not intermittent as would be the case when connected directly with a pump.

What is claimed is:

1. In a device of the character described, a base, a pair of upstanding reservoirs carried thereby and being of different heights, an inclined tube connecting the upper end portions of the reservoirs, the longest reservoir forming an air compression chamber and having its upper end closed, said reservoir having a lateral nipple for the attachment of a pump tube, the shortest reservoir forming a tire-healing liquid container, a detachable cover for the last mentioned reservoir for permitting the same to be readily filled, the last mentioned reservoir having a lateral nipple at its lower end, and a tube connected to the last mentioned nipple for attachment to a pneumatic tire.

2. In a device of the character described, a base board, a pair of upstanding cylindrical reservoirs carried thereby and disposed in spaced relation to each other one of said reservoirs being shorter than the other, an inclined tube connecting the upper end of the taller reservoir with the upper end of the shorter reservoir, the taller reservoir being provided with an air induction port at a point adjacent its upper end below the point of communication of the inclined tube therewith, a removable cover for the shorter reservoir, means for clamping the removable cover in place to permit of the introduction of a tire healing fluid therewithin, the lower end of the shorter reservoir being provided with an outlet nipple, and a hose leading therefrom for conducting the tire healing fluid thereaway from.

In testimony that I claim the foregoing as my own, I have hereto affixed my signature in the presence of two witnesses.

JACOB J. SEAMAN.

Witnesses:
CLARENCE W. MILLER,
OLIVER McROBERTS.